(12) United States Patent
Wisecarver

(10) Patent No.: US 6,872,009 B2
(45) Date of Patent: Mar. 29, 2005

(54) BENDABLE OPTICAL SIGNAL TRANSMITTER PORT

(75) Inventor: Martin Wisecarver, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 68 days.

(21) Appl. No.: 10/224,773

(22) Filed: Aug. 21, 2002

(65) Prior Publication Data

US 2004/0037515 A1 Feb. 26, 2004

(51) Int. Cl.[7] .................................................. G02B 6/36
(52) U.S. Cl. ........................................................ 385/92
(58) Field of Search ............................ 385/51, 64, 82, 385/88, 89, 92, 94

(56) References Cited

U.S. PATENT DOCUMENTS

| | | | | |
|---|---|---|---|---|
| 4,889,406 A | * | 12/1989 | Sezerman ..................... | 385/35 |
| 4,997,243 A | * | 3/1991 | Aiki et al. .................... | 385/92 |
| 5,222,170 A | * | 6/1993 | Bargar et al. ................ | 385/88 |
| 5,347,604 A | * | 9/1994 | Go et al. ...................... | 385/92 |
| 5,631,987 A | | 5/1997 | Lasky et al. ................. | 385/88 |
| 6,179,483 B1 | * | 1/2001 | Kanazawa .................... | 385/93 |
| 6,384,913 B1 | | 5/2002 | Douglas et al. ............. | 356/248 |
| 6,621,067 B2 | * | 9/2003 | He et al. ...................... | 250/225 |
| 2002/0048428 A1 | | 4/2002 | Pfeiffer et al. ............... | 385/24 |
| 2003/0095755 A1 | * | 5/2003 | Vaganov et al. ............. | 385/88 |

* cited by examiner

Primary Examiner—Edward J. Glick
Assistant Examiner—Thomas R Artman
(74) Attorney, Agent, or Firm—Workman Nydegger

(57) ABSTRACT

Embodiments of the invention are generally directed to an optical signal transmitter port. In one embodiment, the optical signal transmitter port includes a nose body having a bendable extending transmission end, and an optical signal housing having an optical source therein assembled into the nose body. The optical signal source generates an optical signal within the nose body and the bendable portion is adjusted to optimize the output of the port. Embodiments of the invention are further related to a method for assembling an optical transmitter port with minimal defects. The assembly process involves a multi-step assembly and measurement process configured to align the axis of the optical signal generated in the port with the axis of an optical signal source housing and an axis of a port nose body.

12 Claims, 3 Drawing Sheets

BENDABLE OPTICAL SIGNAL TRANSMITTER PORT

BACKGROUND OF THE INVENTION

1. Field of the Invention

Embodiments of the invention generally relate to fiber optic signal transmission technologies, and more specifically, to optical signal transmitter ports used in fiber optic applications.

2. Description of the Related Art

Telecommunications and data transmission industries are rapidly expanding their development of fiber optic transmission systems. Historically, telecommunication signals and data have been transmitted over wire lines, such as twisted pair or coaxial cables, however, in order to accommodate higher signal rate speeds and increased data bandwidth, many telecommunications and data transmission industries are turning to fiber optic cables as their preferred transmission medium.

As the use of fiber optic transmission systems increases, the need for optical signal transmitters also increases. An optical signal transmitter generally includes an optical signal transmitter port, which is generally made up of several components, such as an optical assembly and an optical signal housing, for example. The optical assembly, i.e., the source of light and any associated lenses, is generally affixed into or within the optical signal housing via epoxy or other gluing means. The lenses are generally configured to collect the optical signal generated by a source, i.e., a laser, and project the optical signal along an optical axis that runs through the center of the collection of lenses and out through the center of an aperture at a terminating end of the port. Since several components generally make up an optical signal transmitter port, the assembly process is prone to defects and errors. For example, it is not uncommon for a transmitter port to not emit an optical signal after assembly as a result of misalignment of the optical source within the port body, as the optical signal is either partially or completely blocked within the body as a result of the misalignment. In this situation, the manufacturer will generally either repair the misalignment via an alignment welding process or discard the optical signal transmitter port as a defect part that is inoperable.

Therefore, in view of the time and cost implications associated with alignment welding and discarding defect parts, there exists a need for an improved optical signal transmitter port and a method for manufacturing or assembling the same with minimal defects.

SUMMARY OF THE INVENTION

Embodiments of the invention are generally directed to an optical signal transmitter port that includes a nose body and an optical signal source assembly assembled into the nose body. The nose body includes a bendable portion configured to align the optical signal generated by the optical signal source within the nose body with an optical axis of the nose body so that the optical signal is not blocked or otherwise interfered with while traveling out of the nose body.

Embodiments of the invention further provide an optical signal transmitter port having a nose body with a bendable portion proximate a signal emission end of the nose body. The bendable portion of the nose body is generally configured to align an optical axis of the nose body with an optical axis of an emitted optical signal. The port further includes an optical signal housing assembled into the nose body, and an optical source assembly assembled into the optical signal housing.

Embodiments of the invention further provide a method of assembling an optical signal transmitter port. The method generally includes assembling an optical source into an optical signal housing, determining if an optical signal emitted from the optical source needs to be adjusted to align an axis of the optical signal with an axis of the optical signal housing, and machining the optical signal housing if the optical signal housing needs to be adjusted, the machining step being configured to allow the optical signal housing to pressed into a nose body and generate an optical signal therefrom that has a common axis with the axis of the optical signal housing. The method further includes assembling the optical signal housing into the nose body, determining whether the optical signal aligns with an optical axis of the nose body, and adjusting a bendable portion of the nose body to align the optical signal with an optical axis of the nose body if the optical signal does not align with the optical axis of the nose body.

Embodiments of the invention further provide a method for assembling an optical transmitter port, wherein the method includes securing an optical source into an optical source housing, powering the optical source to emit an optical signal from an emission end of the optical housing, and measuring the optical signal emitted from the optical source housing to determine a first axial offset. Thereafter, the method includes machining the optical signal housing to correct the first axial offset by aligning an axis of the optical signal with an axis of the optical source housing, press fitting the optical source housing into a nose body, powering the optical source to emit the optical signal from a bendable terminating end of the nose body, and measuring the optical signal emitted from the bendable terminating end to determine a second axial offset. Once the second axial offset is determined, the method includes bending the bendable terminating end of the nose body to adjust an axis thereof to coincide with the axis of the optical signal, thus correcting the second axial offset.

BRIEF DESCRIPTION OF THE DRAWINGS

So that the manner in which the above recited features of the invention may be understood in detail, a more particular description of the invention, briefly summarized above, may be had by reference to the embodiments thereof, which are illustrated in the appended drawings. It is to be noted, however, that the appended drawings illustrate only typical embodiments of the invention, and are therefore, not to be considered limiting of its scope, for the invention may admit to other equally effective embodiments without departing from the true scope thereof.

DETAILED DESCRIPTION OF THE PREFERRED EMBODIMENT

Embodiments of the invention are generally directed to an optical signal transmission port and a method for assembling the same. The optical signal transmitter port of the invention includes a housing or nose body having a means for receiving an optical source therein. Once the optical source is positioned in the nose body, an extending portion of the nose body may be adjusted to align the axis of the extended portion of the nose body with the axis of the optical signal generated by the source. This allows for minimal blockage of the optical signal as it travels out of the nose body from the optical source.

Embodiments of the invention are further directed to a method for assembling an optical signal transmission port of the invention. The method generally includes assembling an optical source assembly apart from the nose body portion. The axis of the optical output of the optical source assembly is then measured to determine if the axis is skewed from a center axis or point. If the optical signal axis is determined to be skewed, then the outer portions of the optical source assembly may be machined to correct for the skewed signal axis, so that once the source assembly is positioned in the nose body, the optical signal will travel through the nose body and not terminate as a result of contacting the inside walls of the nose body. Once it is determined that the optical signal is in alignment, the optical source assembly is assembled into the nose body. A determination is then made as to whether the optical signal projecting out of the nose body aligns with the optical axis of the nose body. If it is determined that the optical signal projecting out of the nose body does not align with the optical axis of the nose body, then the bendable portion of the nose body is adjusted until the optical signal aligns with the optical axis of the nose body.

Figure 1:
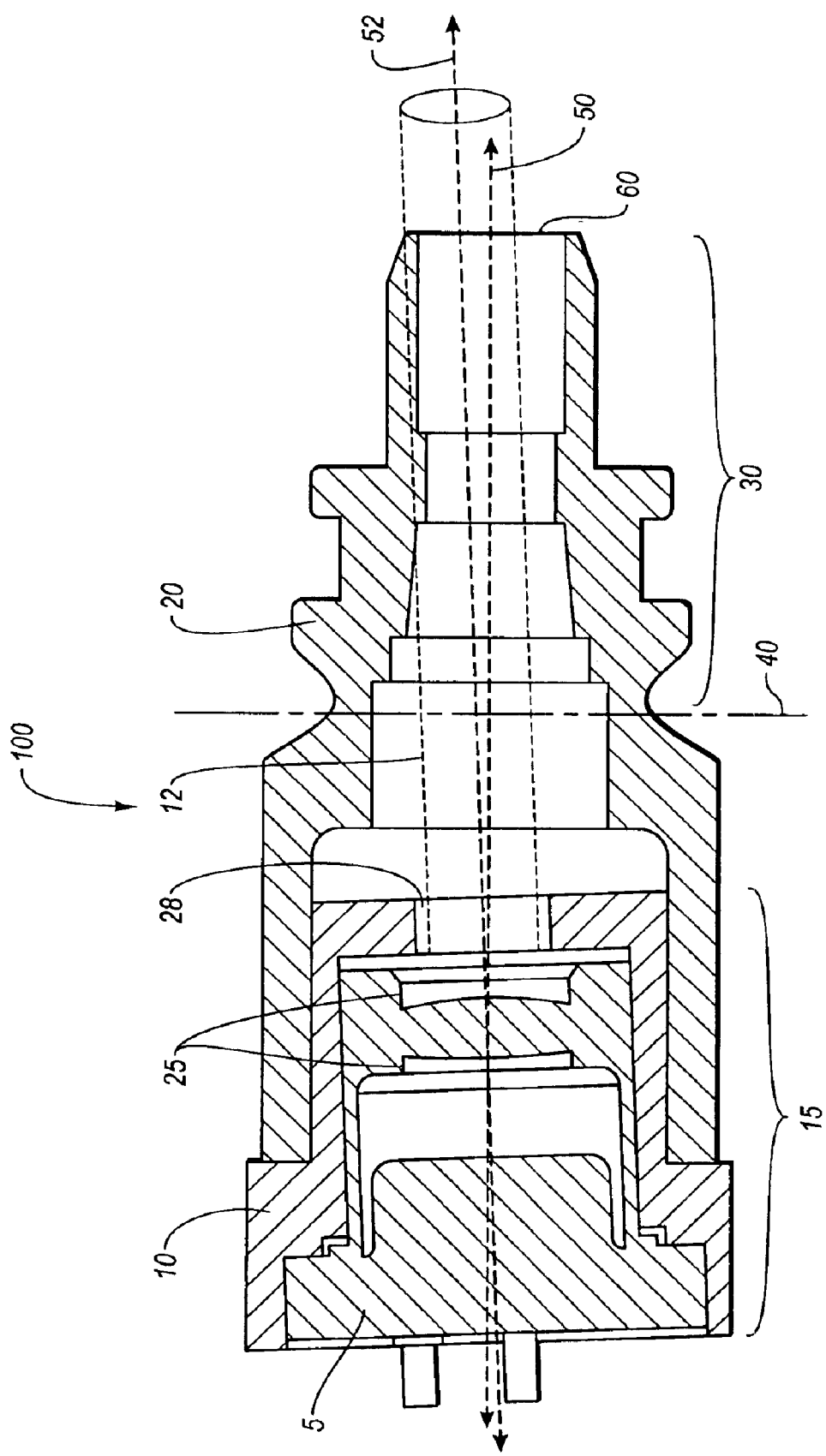
FIG. 1 illustrates a side cross sectional view of an optical signal transmitter port in accordance with an embodiment of the invention.

Referring now to FIG. 1, a side cross sectional view of an optical signal transmitter port 100 in accordance with an embodiment of the invention is illustrated. The optical signal transmitter port 100 includes an optical source assembly 15 assembled into a nose body 20. The optical source assembly 15 may be assembled into the nose body 20 by being press-fitted therein. It will be appreciated by those skilled in the art, however, that other means for assembling the optical source assembly 15 into the nose body 20 may be used without departing from the scope of the invention. The optical source assembly 15 generally includes an outer casing 10 and an optical signal source 5 positioned within the outer casing or housing 10. The optical signal source 5 may be a laser diode configured to emit a beam of laser light 12 therefrom. Alternatively, the optical signal source 5 may also be a vertical cavity surface emitting laser (VCSEL) diode, for example, or another light-emitting source commonly used in fiber optic device technology. The optical assembly 15 further includes a collection of lenses 25 positioned in the optical path of an optical signal 12 generated by the optical source 5. The collection of lenses 25 may be, for example, one ore more a planar convex lenses that collimate the optical signal 12 along an optical axis 52 (see FIG. 2) that runs through the center of the collection of lenses 25. However, as will be further discussed herein, the longitudinal axis of the optical signal 12 may not exactly coincide with the axis 51 of the optical source assembly 15, and therefore, the outer surfaces 25 of optical source assembly 15 may be machined to realign the optical axis 52 with the axis 51 of the optical source assembly.

Nose body 20 generally includes an aperture 60 positioned at a terminating end of the nose body 20 opposite of the optical signal source 5, as illustrated in FIG. 1. The aperture 60 is generally configured to transmit the optical signal 12 out of the nose body 20. The nose body 20 includes a longitudinally extending bendable portion 30 that terminates at aperture 60 and is bendable around a bend point or annulus 40. When bent, the bendable portion 30 is configured to align the axis 52 of the optical signal 12 with a longitudinal axis 50 of the nose body 20 and aperture 60, as illustrated in FIG. 1. The nose body 20 is generally manufactured from a material that is sufficiently malleable to allow for bending or flexing the bendable portion 30 to a desired position, while also being sufficiently rigid to hold the bendable portion 30 in a desired position once the respective axis are aligned via the bending operation. For example, the nose body 20 may be made from a material with a coefficient of thermal expansion (CTE) of 416. Alternatively, a material having a modulus that is generally close to that of heat treated 416 may effectively be used. Exemplary materials for nose body 20 include Kovar, Carpenter 630, and various grades of stainless, i.e., 17-4 ph. Further, the bendable portion 30 is generally shorter in length when compared to the rest of nose body 20. For example, the distance from the bendable point 40 to the aperture 60 of the nose body 20 may be about three times the distance from the bendable point 40 to aperture 28 of the optical signal source 5, which facilitates easy adjustment of the optical axis 50 to coincide with axis 52.

Figure 2:
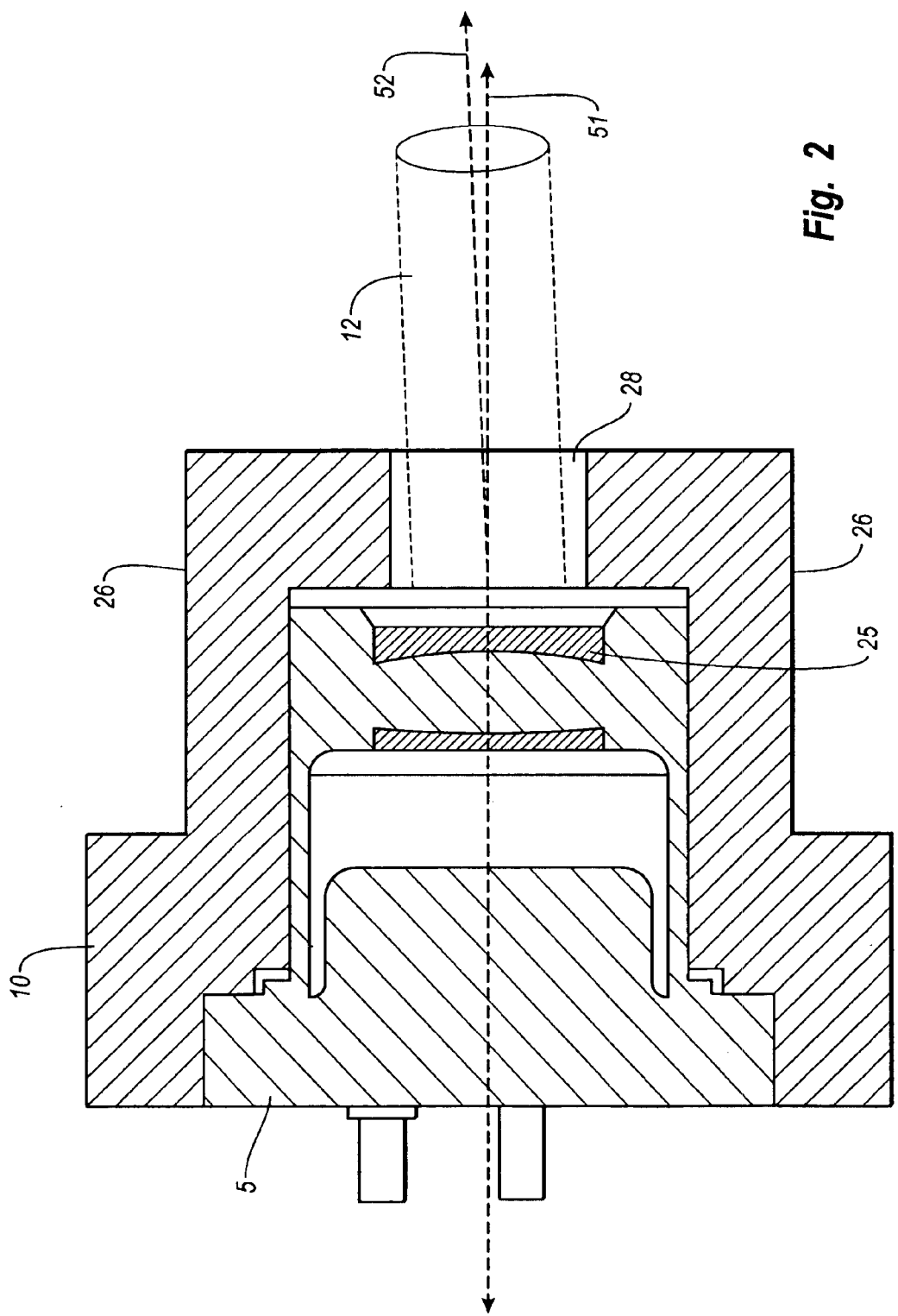
FIG. 2 illustrates an optical assembly assembled into an optical signal housing in accordance with an embodiment of the invention.

When the optical axis 52 of the optical signal 12 aligns with the optical axis 50 of the nose body 20, the optical signal 12 projecting out of the optical assembly 15 will be completely transmitted through the center of the aperture 60 of the nose body 20 without degradation. On the other hand, when the optical axis 52 of the optical signal 12 does not align with the optical axis 50 of the nose body 20, the optical signal 12 projecting out of the optical assembly 15 may only be partially transmitted through the aperture 60, which may result in optical signal loss (as shown in FIG. 1). Likewise, when the optical axis 52 of the optical signal 12 aligns with the optical axis 51 of the optical signal housing 10, the optical signal 12 projecting out of the optical assembly 15 will be completely transmitted through the center of the aperture 28 of the optical signal housing 28. Additionally, as shown in FIG. 2, when the optical axis 52 of the optical signal 12 emitted from the optical source 10 does not align with the optical axis 51 of the optical signal source housing 10, the optical signal 12 projecting out of the optical assembly 15 may only be partially transmitted through the aperture 28 of the optical signal housing 10, which may again result in optical signal loss.

Figure 3:
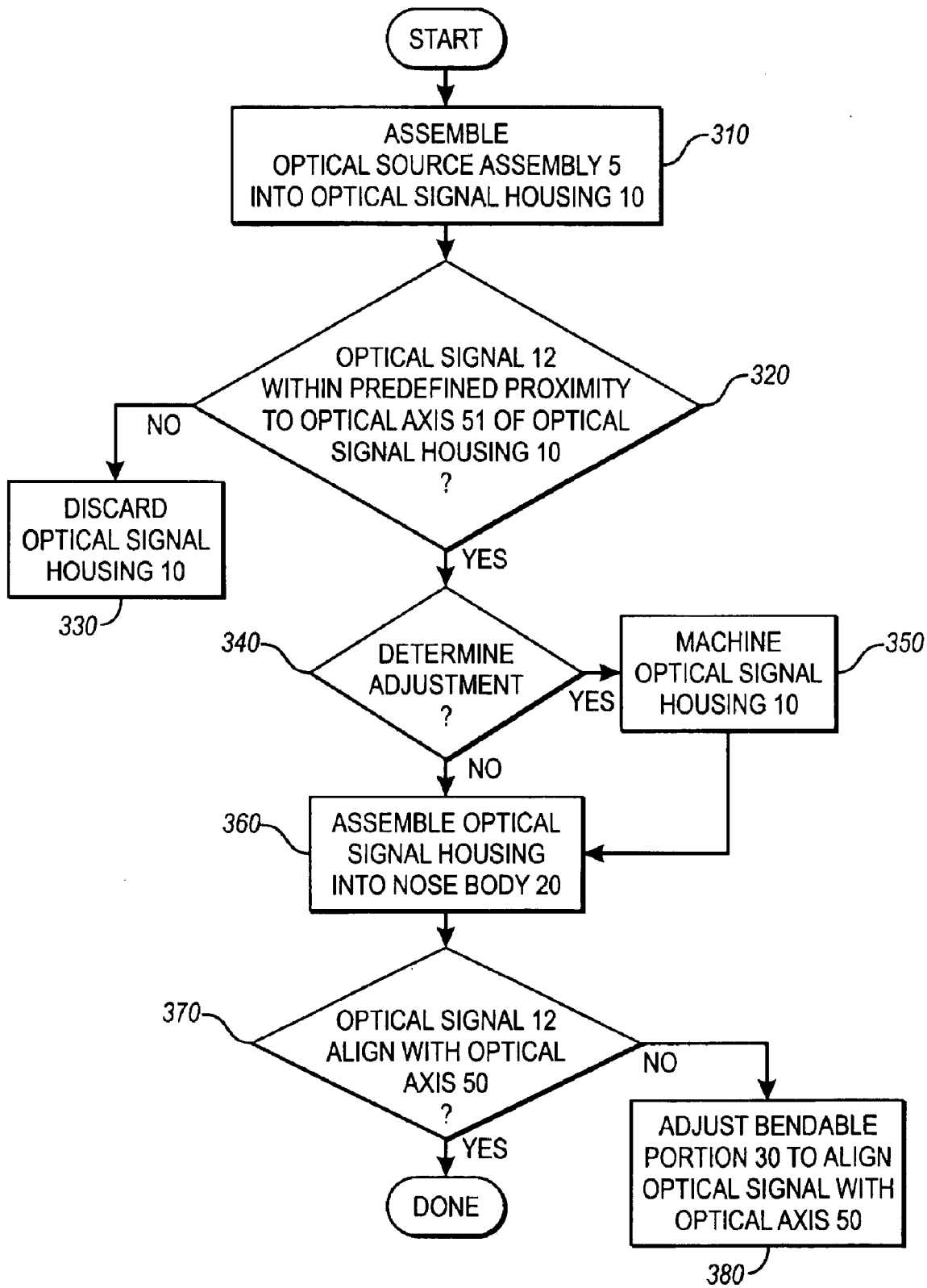
FIG. 3 illustrates a method of assembling an optical signal transmitter port in accordance with an embodiment of the invention.

Referring now to FIG. 3, a method 300 of assembling the optical signal transmitter port 100 in accordance with an embodiment of the invention is illustrated. At step 310, the optical source assembly 5 is press fitted into the optical signal housing 10. Once the optical source 5 is assembled into the optical signal housing 10, the optical source is powered up and a determination is made as to whether the optical signal 12 emitted therefrom is within a predefined proximity to the optical axis 51 of the optical source signal housing 10 (step 320—as illustrated in FIG. 2). In other words, a determination is made as to whether the optical axis 52 of the optical signal 12 is within a predefined proximity to the optical axis 51 of the optical signal housing 10. This determination may be performed by a Z-camera station, which is a machine configured to determine whether the optical signal 12 aligns with the optical axis 51 and to provide the measurements for adjusting the optical signal housing 10. The measurements may indicate the locations and the angles of the optical signal housing 10 that need to be adjusted so that when the optical signal housing 10 is assembled into the nose body 20, the optical signal 12 will align with the optical axis 50 of the nose body. The detailed operation of this machine is beyond the scope of the invention, and therefore, the Z-camera station will not be discussed in detail, except as it pertains to the invention.

If it is determined that the optical signal 12 is not within the predefined proximity to the optical axis 51 of the optical signal housing 10, then processing continues to step 330. A determination that the optical signal 12 is not within the predefined proximity to the optical axis 51 of the optical signal housing indicates that the optical signal housing 10 cannot be adjusted to align the optical signal 12, and the optical signal housing 10 is discarded as a defect part (step 330). If it is determined that the optical signal 12 is within the predefined proximity to the optical axis 51, then processing continues to step 340, where a determination is made as to how the optical signal housing 10 is to be adjusted to bring the optical signal axis into alignment with the axis 51 of the housing 10. If no adjustment is necessary, then processing continues to step 360. If adjustment is necessary, then the method continues to step 350 where the exterior surfaces 26 of housing 10 are precisely machined. The machining is generally configured to adjust the physical position of the entire housing 10 once positioned in the nose body 20, such that the optical signal outputted therefrom will be transmitted along axis 50 of nose body 20. The machining process generally includes machining the outer surfaces of housing 10 to physically adjust the received position of housing 10 in nose body 20. Once the outer perimeter surfaces of the optical signal housing 10 are machined, processing continues to step 360.

At step 360, the optical signal housing 10 is assembled into the nose body 20, via, for example, a shrink-fitting operation. Once the optical signal housing 10 is assembled into the nose body 20, the optical source 5 may again be powered up and a determination made as to whether the optical signal 12 aligns with the optical axis 50 of the nose body 20 (step 370). In other words, a determination is made as to whether the optical axis 52 of the optical signal 12 aligns with the optical axis 50 of the nose body 20. A determination that the optical signal 12 aligns with the optical axis 50 indicates that the optical signal 12 completely transmits through the center of the aperture 60 of the nose body 20, and therefore, the port 100 is properly assembled. If it is determined that the optical signal 12 does not align with the optical axis 50 of the nose body 20, then the bendable portion 30 of the nose body 20 is adjusted until the optical signal 12 aligns with the optical axis 50 of the nose body 20 (step 380). The bending operation includes adjusting the bendable portion of the nose body 20 to a position calculated to relax in a manner that aligns axis 50 with axis 52. The calculation of level of bending required may include a relaxation parameter, i.e., the nose body 20 may be bent past the desired point of calculated axial alignment, so that when the nose body 20 relaxes after the bending force is removed, the respective axes will be in alignment.

The above noted apparatus and methods generally provide an optical transmitter port that may be assembled with minimal defects and with optimal throughput. Defects are minimized through the machining and bending processes provided by the invention, which would generate defects in conventional apparatuses and methods of assembling optical ports. While the foregoing is directed to embodiments of the invention, other and further embodiments of the invention may be devised without departing from the basic scope thereof, and the scope thereof is determined by the claims that follow.

What is claimed is:

1. A method of assembling an optical signal transmitter port, comprising:

assembling an optical source into an optical signal housing;

determining if an optical signal emitted from the optical source needs to be adjusted to align an axis of the optical signal with an axis of the optical signal housing;

machining the optical signal housing if the optical signal housing needs to be adjusted, the machining step being configured to allow the optical signal housing to pressed into a nose body and generate an optical signal therefrom that has a common axis with the axis of the optical signal housing;

assembling the optical signal housing into the nose body;

determining whether the optical signal aligns with an optical axis of the nose body; and adjusting a bendable portion of the nose body to align the optical signal with an optical axis of the nose body if the optical signal does not align with the optical axis of the nose body.

2. The method of claim 1, wherein assembling the optical source into the optical signal housing comprises at least one of press fitting and shrink fitting the optical assembly into the optical signal housing.

3. The method of claim 1, wherein determining if an optical signal emitted from the optical source needs to be adjusted comprises analyzing the optical signal on a Z-camera station measuring apparatus.

4. The method of claim 1, wherein determining whether the optical signal housing needs to be adjusted comprises:

determining whether the optical signal is within a predefined proximity of an optical axis of the optical signal housing; and determining that the optical signal housing is to be discarded if the optical signal is not within the predefined proximity of the optical axis of the optical signal housing.

5. The method of claim 1, wherein determining whether the optical signal housing needs to be adjusted comprises:

determining whether the optical signal is within a predefined proximity of an optical axis of the optical signal housing;

determining whether the optical signal aligns with the optical axis of the optical signal housing if the optical signal is within the predefined proximity of the optical axis of the optical signal housing; and determining that the optical signal housing needs to be adjusted if the optical signal does not align with the optical axis of the optical signal housing.

6. The method of claim 1, wherein adjusting the optical signal housing comprises machining an exterior portion of the optical signal housing so as to align the optical signal with an optical axis of the nose body when the optical signal housing is assembled into the nose body.

7. The method of claim 1, wherein the nose body includes an aperture for transmitting the optical signal out of the nose body; and wherein adjusting the optical signal housing comprises adjusting the optical signal housing so as to transmit the optical signal through the center of the aperture of the nose body when the optical signal housing is assembled into the nose body.

8. The method of claim 1, wherein adjusting the optical signal housing comprises at least one of machining, grinding, and milling exterior surfaces of the optical signal housing.

9. The method of claim 1, wherein assembling the optical signal housing into the nose body of an optical signal transmitter port comprises at least one of press-fitting and shrink-fitting the optical signal housing into the nose body.

10. The method of claim 1, wherein adjusting the nose body to align the optical signal with the optical axis of the nose body comprises bending the bendable portion of the nose body to a position calculated to relax to a position where an axis of the optical signal aligns with an axis of the nose body.

11. The method of claim 1, wherein the nose body comprises an aperture for transmitting the optical signal out of the nose body; and wherein an optical axis of the nose body runs through the center of the aperture.

12. A method for assembling an optical transmitter port, comprising:

securing an optical source into an optical source housing;

powering the optical source to emit an optical signal from an emission end of the optical housing;

measuring the optical signal emitted from the optical source housing to determine a first axial offset;

machining the optical signal housing to correct the first axial offset by aligning an axis of the optical signal with an axis of the optical source housing;

press fitting the optical source housing into a nose body;

powering the optical source to emit the optical signal from a bendable terminating end of the nose body;

measuring the optical signal emitted from the bendable terminating end to determine a second axial offset; and bending the bendable terminating end of the nose body to adjust an axis thereof to coincide with the axis of the optical signal, thus correcting the second axial offset.

\* \* \* \* \*

UNITED STATES PATENT AND TRADEMARK OFFICE
CERTIFICATE OF CORRECTION

PATENT NO.         : 6,872,009 B2                                          Page 1 of 1
APPLICATION NO. : 10/224773
DATED              : March 29, 2002
INVENTOR(S)        : Martin Wisecarver It is certified that error appears in the above-identified patent and that said Letters Patent is hereby corrected as shown below:

Column 2
Line 13, change "pressed" to --press--

Column 3
Line 53, change "ore more a" to --or more--

Column 4
Line 10, change "axis" to --axes--
Line 40, change "10" to --5--
Line 46, remove [300]

Column 6
Line 9, change "pressed" to --press--

Signed and Sealed this

Twenty-third Day of November, 2010

David J. Kappos
*Director of the United States Patent and Trademark Office*